US011859432B2

(12) United States Patent
Mayr

(10) Patent No.: US 11,859,432 B2
(45) Date of Patent: Jan. 2, 2024

(54) CONTROL UNIT AND METHOD FOR OPERATING AN AUTOMATIC FLAP AND/OR DOOR

(71) Applicant: Bayerische Motoren Werke Aktiengesellschaft, Munich (DE)

(72) Inventor: Juergen Mayr, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 72 days.

(21) Appl. No.: 17/423,364

(22) PCT Filed: Nov. 29, 2019

(86) PCT No.: PCT/EP2019/083075

§ 371 (c)(1),
(2) Date: Jul. 15, 2021

(87) PCT Pub. No.: WO2020/151857

PCT Pub. Date: Jul. 30, 2020

(65) Prior Publication Data

US 2022/0127896 A1 Apr. 28, 2022

(30) Foreign Application Priority Data

Jan. 22, 2019 (DE) ..................... 10 2019 101 514.6

(51) Int. Cl.
*E05F 15/00* (2015.01)
*E05F 15/79* (2015.01)
*E05F 15/71* (2015.01)

(52) U.S. Cl.
CPC .............. *E05F 15/79* (2015.01); *E05F 15/71* (2015.01); *E05Y 2201/41* (2013.01);
(Continued)

(58) Field of Classification Search
CPC ........... E05F 15/71; E05F 15/79; E05F 15/00; E05Y 2400/40; E05Y 2400/44;
(Continued)

(56) References Cited

U.S. PATENT DOCUMENTS 6,115,965 A * 9/2000 Jennings ................ E05F 15/47 49/340
8,225,458 B1 * 7/2012 Hoffberg ................ E05F 15/73 16/84

(Continued)

FOREIGN PATENT DOCUMENTS

CN 101285363 A 10/2008
CN 107128282 A 9/2017

(Continued)

OTHER PUBLICATIONS

Chinese-language Office Action issued in Chinese Application No. 201980080021.X dated Apr. 2, 2022 with English translation (11 pages).

(Continued)

*Primary Examiner* — Chi Q Nguyen
(74) *Attorney, Agent, or Firm* — Crowell & Moring LLP

(57) ABSTRACT

An apparatus includes a control unit. The control unit is configured to control an automatic flap and/or door. The flap and/or door is automatically transferrable from an open position into a closed position by at least one actuator. The flap and/or door is configured to press against a seal when in the closed position. In relation to a closing operation of the flap and/or door, the control unit is configured to determine time information in relation to an open state time duration during which the flap and/or door was in the open position before the closing operation. In relation to a closing operation of the flap and/or door, the control unit is also config-
(Continued)

ured to operate the at least one actuator configured for the closing operation as a function of the time information.

11 Claims, 3 Drawing Sheets

(52) U.S. Cl.
CPC ....... *E05Y 2400/36* (2013.01); *E05Y 2400/44* (2013.01); *E05Y 2900/531* (2013.01)

(58) Field of Classification Search
CPC ......... E05Y 2900/531; E05Y 2400/456; E05Y 2900/546; E05Y 2400/36; E05Y 2201/41
USPC .......................................................... 49/29
See application file for complete search history.

(56) References Cited

U.S. PATENT DOCUMENTS

| | | | | |
|---|---|---|---|---|
| 8,547,046 | B2 * | 10/2013 | Burris | E05F 3/227 49/31 |
| 10,236,801 | B2 * | 3/2019 | Dye | E05F 15/619 |
| 11,299,923 | B2 * | 4/2022 | Seidl | B60J 5/101 |
| 2007/0256362 | A1 * | 11/2007 | Hansen | E05F 15/75 49/32 |
| 2008/0184525 | A1 | 8/2008 | Cruz et al. | |
| 2009/0033189 | A1 | 2/2009 | Glanz et al. | |
| 2012/0234621 | A1 | 9/2012 | Syvret et al. | |
| 2017/0247929 | A1 | 8/2017 | Lombrozo et al. | |
| 2017/0251092 | A1 | 8/2017 | Elie et al. | |
| 2017/0260795 | A1 | 9/2017 | Jergess | |
| 2020/0308882 | A1 * | 10/2020 | Salter | E05B 81/08 |
| 2021/0301561 | A1 * | 9/2021 | Cumbo | E05B 83/36 |

FOREIGN PATENT DOCUMENTS

| | | | |
|---|---|---|---|
| CN | 107165530 | A | 9/2017 |
| CN | 108699884 | A | 10/2018 |
| CN | 108798351 | A | 11/2018 |
| DE | 10 2007 036 746 | A1 | 2/2009 |
| DE | 10 2017 103 445 | A1 | 8/2017 |
| JP | 2017-14813 | A | 1/2017 |
| KR | 10-1772099 | B1 | 8/2017 |

OTHER PUBLICATIONS

International Search Report (PCT/ISA/210) issued in PCT Application No. PCT/EP2019/083075 dated Mar. 5, 2020 with English translation (four (4) pages).
German-language Written Opinion (PCT/ISA/237) issued in PCT Application No. PCT/EP2019/083075 dated Mar. 5, 2020 (five (5) pages).
German-language Search Report issued in German Application No. 10 2019 101 514.6 dated Jan. 8, 2020 with partial English translation (12 pages).

* cited by examiner

CONTROL UNIT AND METHOD FOR OPERATING AN AUTOMATIC FLAP AND/OR DOOR

BACKGROUND AND SUMMARY OF THE INVENTION

The disclosure relates to a method and a corresponding control unit for operating an automatic flap and/or door, in particular a tailgate of a vehicle.

A vehicle can have an automatic tailgate which, for example, can be opened and/or closed automatically by one or more electromechanical drives. Furthermore, a vehicle can have a vehicle door, in particular a driver's door of the vehicle, which can be opened and/or closed automatically. A vehicle can thus have one or more doors and/or flaps which can be opened and/or closed automatically by means of one or more actuators.

In a flap and/or door, a closing system with "a pre- and main latch" can be used, wherein the closing operation of an automatic flap and/or door can be viewed as completed as soon as the closing system is in the "pre-latch". For a successful closing operation, i.e. for secure latching of the lock of a flap and/or door in the pre-latch, typically a specific minimum closing energy is required, wherein the minimum closing energy can be effected by a minimum closing speed of the flap and/or door. For example, the one or more actuators of a flap and/or door can be set during the production of a vehicle in such a way that the flap and/or door has a specific closing speed during a closing operation. The definition of a specific closing speed during the production of a vehicle can lead to problems during an automatic closing operation of the flap and/or door, in particular after a relatively long operating duration of the vehicle and/or after a comparatively long open standing time of a flap and/or door.

SUMMARY

The present disclosure deals with the technical object of increasing the reliability and the convenience of a closing operation of an automatic flap and/or door in an efficient way.

The object is achieved by each of the independent claims. Advantageous embodiments are described, inter alia, in the dependent claims. It is pointed out that additional features of a patent claim that depends on an independent patent claim without the features of the independent patent claim or only in combination with a subset of the features of the independent patent claim can form an invention which is individual and independent of the combination of all the features of the independent patent claim and which can be made the subject matter of an independent claim, a divisional application or a subsequent application. This applies in the same way to technical teaching described in the description which can form an invention that is independent of the features of the independent patent claims.

According to one aspect, a control unit for an automatic flap and/or door is described. This can be in particular a flap and/or door of a vehicle, in particular a roadgoing motor vehicle, for example a tailgate or a driver's door. The flap and/or door can be part of a flap and/or door arrangement. The arrangement comprises a frame and/or cutout, into which the flap and/or door can be transported in order to close the flap and/or door. The flap and/or door can be moved from an open position into a closed position relative to the cutout by means of one or more hinges and/or rotary joints. In particular, the flap and/or door can be transferred automatically from the open position into a closed position by at least one actuator (e.g. by at least one electric motor). In the open position, the flap and/or door can be moved relatively freely in order to permit an access through the cutout (in particular an access to an interior of a vehicle). On the other hand, in a closed state, the flap and/or door is typically retained by a lock, in particular by a catch (e.g. a pre-latch or a main latch) of the flap and/or door arrangement.

The closed position (in particular in a vehicle) can comprise a pre-latching position and a main latching position. The actuator can be set up to transfer the flap and/or door from an open position into the pre-latching position. In the pre-latching position, the flap and/or door can be held by a pre-latch in the lock of the flap and/or door arrangement. Typically, a relatively small gap continues to remain between the flap and/or the door and the cutout. Furthermore, the flap and/or door arrangement can comprise a closing device which is separate from the actuator and which is set up to transfer the flap and/or door from the pre-latching position into the main latching position. In the main latching position, the flap and/or door can be held by a main latch in the lock of the flap and/or door arrangement. There is then typically no longer any significant gap between the flap and/or the door and the cutout. A reliable transfer into the main latching position can be ensured by the closing device.

The flap and/or door can thus be transferred into the completely closed main latching position in two stages. Firstly, the actuator can transfer the flap and/or door from an open position into the pre-latching position via a (continuing to be open) intermediate position. The opening angle of the flap and/or door, for example in a completely open starting position, can be 50° or more, 70° or more or 90° or more. Furthermore, the opening angle of the flap and/or door in the pre-latching position can be around 1°-3° and in the main latching position around 0°.

When the pre-latching position is reached, the closing operation with respect to the actuator is typically completed. Then, the closing device typically performs the transfer of the flap and/or door from the pre-latching position into the main latching position.

A flap and/or door arrangement typically has a seal (between frame or cutout and flap and/or door), the properties of which can change in the course of the lifetime of a flap and/or door arrangement. Furthermore, the different components of a flap and/or door arrangement typically have tolerances with respect to one or more properties. This can lead to the necessary closing speed for a closing operation of the actuator varying in the course of the lifetime of a flap and/or door arrangement and for different flap and/or door arrangements.

The flap and/or door can thus press against a seal when in the closed position. The seal can be formed in such a way that a mechanical resistance applied to the flap and/or door by the seal during a closing operation because of a relaxation behavior of the seal depends on the duration during which the seal could relax.

For a closing operation of the flap and/or door, the control unit can be set up to determine time information in relation to the open state duration during which the flap and/or door was in the open position (without interruption) before the closing operation. The open state duration can correspond to the duration during which the seal could relax.

The flap and/or door arrangement can comprise a sensor which is set up to detect sensor data as to whether the flap and/or door is in the open position or whether the flap and/or door is in the closed position. The control unit can be set up to determine the time information in a precise way on the basis of the sensor data from this sensor.

In addition, the control unit is set up to operate the at least one actuator for the closing operation as a function of the time information. In particular, the control unit can be set up to adjust the closing speed of the flap and/or door, at least for one phase of the closing operation, as a function of the time information in relation to the open state duration. The closing speed of the flap and/or door, at least for one phase of the closing operation, can be increased with an increasing open state duration. It is thus possible to take the relaxation behavior of the seal of a flap and/or door arrangement during a closing operation into account, in order to increase the reliability and the convenience of a closing operation.

The control unit can be set up to operate the at least one actuator for the closing operation as a function of characteristic data. In particular, the closing speed can be adapted as a function of the characteristic data, at least phase by phase. The characteristic data can indicate a relationship between the open state duration and the closing speed to be used and/or a closing profile to be used (i.e. a time profile of the closing speed that is to be used) for the closing operation. The characteristic data can be determined experimentally in advance. By taking characteristic data into account, the reliability and the convenience of a closing operation can be increased further.

Alternatively or additionally, the control unit can be set up to determine usage data in relation to the duration of the usage of the seal. The at least one actuator can then be operated as a function of the usage information for the closing operation. By taking the usage duration of a seal into account during the operation of the actuator, the reliability and the convenience of a closing operation can be increased further.

The control unit can be set up to operate the actuator for a closing operation as a function of a closing profile (i.e. as a function of a time profile of the closing speed). The closing profile can be adapted as a function of the usage information and/or the time information. In particular, the closing profile can be adapted with an offset as a function of the duration of the usage of the seal and/or the open state duration. Thus, the usage information and/or the time information can be taken into account in an efficient and reliable way.

A closing operation can have a starting phase (with increasing closing speed), a main phase (with constant closing speed) and a run-out phase (with decreasing closing speed). The control unit can be set up to operate the at least one actuator exclusively during the run-out phase as a function of the time information and/or as a function of the usage information. Thus, a reliable and convenient closing operation can be enabled in a particularly efficient way.

The control unit can be set up to determine temperature data in relation to the temperature of the seal during or before the closing operation. For example, the internal and/or external temperature of a vehicle can be measured. The temperature data can then indicate the internal/or external temperature of the vehicle. From the temperature data, conclusions can then be drawn about the temperature of the seal. In particular, the internal and/or external temperature of the vehicle can serve as an indicator of the temperature of the seal.

The relaxation behavior and/or the setting behavior of a seal typically depends on the temperature of the seal (and is typically accelerated with increasing temperature). In particular, the relaxation of the seal can take place more quickly at a relatively high temperature than at a relatively low temperature. Furthermore, the setting of the seal can take place more quickly at a relatively high temperature than at a relatively low temperature.

The at least one actuator for the closing operation can then be operated as a function of the temperature data. In particular, the closing speed can be adapted (increased or reduced) as a function of the temperature data. In particular, a relatively high temperature can lead to an increase in the closing speed (in order to compensate for the accelerated relaxation behavior). On the other hand, a relatively low temperature can lead to a reduction in the closing speed (in order to compensate for the slowed relaxation behavior).

According to a further aspect, a method for operating an automatic flap and/or door is described, wherein the flap and/or door can be transferred automatically from an open position into a closed position by at least one actuator, and wherein the flap and/or door presses against a seal when in the closed position.

For a closing operation of the flap and/or door, the method comprises the determination of time information in relation to an open state duration during which the flap and/or door was in the open position before the closing operation. In addition, the method comprises the operation of the at least one actuator for the closing operation as a function of the time information.

According to a further aspect, a (roadgoing) motor vehicle (in particular a passenger car or a truck or a bus) which comprises the control unit described in this disclosure is described.

According to a further aspect, a software (SW) program is described. The SW program can be set up to be executed on a processor (e.g. on a control device of a vehicle) and as a result to carry out the method described in this disclosure.

According to a further aspect, a storage medium is described. The storage medium can comprise an SW program which is set up to be executed on a processor and as a result to carry out the method described in this disclosure.

It should be noted that the methods, devices and systems described in this disclosure can be used both on their own and also in combination with other methods, devices and systems described in this disclosure. Furthermore, any aspects of the methods, devices and systems described in this disclosure can be combined with one another in diverse ways. In particular, the features of the claims can be combined with one another in diverse ways.

The embodiments of the invention are described in more detail below by using exemplary embodiments, in connection with which:

DETAILED DESCRIPTION OF THE DRAWINGS

Figure 1A:
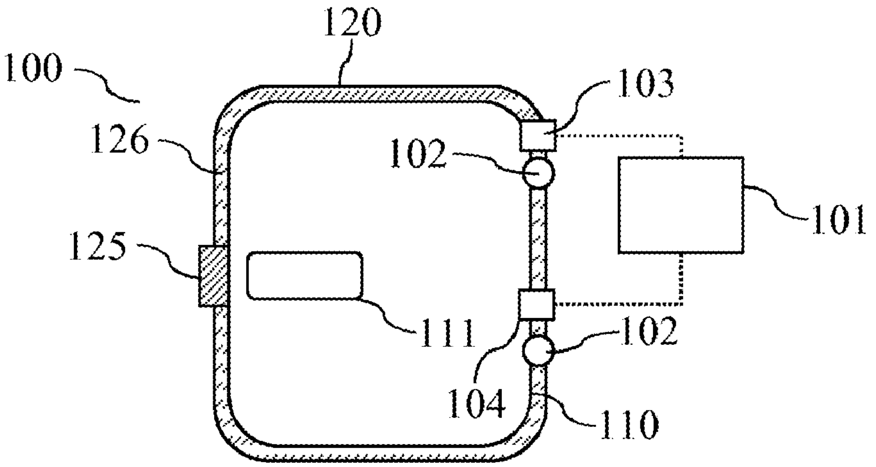
FIG. 1*a* shows an exemplary flap and/or door of a vehicle.

As explained at the beginning, the present disclosure deals with increasing the reliability and the convenience of an automatic closing operation of a flap and/or door in an efficient way. In this connection, FIG. 1*a* shows a block diagram of an exemplary door/flap arrangement 100. The arrangement 100 can, for example, correspond to a side door of a vehicle or a tailgate of a vehicle. The aspects described in connection with an arrangement 100 thus apply both to a door and to a flap of a vehicle. In the following text, a flap of a vehicle will specifically be discussed. The aspects described apply correspondingly to a door, so that the term "flap" can be replaced by the term "door".

The arrangement 100 comprises a frame or a cutout 120 and a flap 110 arranged in the frame or cutout 120. The flap 110 is movably fixed to the frame or cutout 120 via hinges 102. A seal 126 can be arranged in the frame or cutout 120 in order to seal off the interspace between the flap 110 and the frame or cutout 120 when the flap 110 is in the closed state.

Furthermore, a lock 125, with which the flap 110 can be closed and optionally locked, is arranged in the frame or cutout 120. The flap 110 can be closed via a pre-latch and a main latch. The flap 110 can have a handle 111, which makes it possible for a user to open the flap 110. In particular, a user can operate a pushbutton, a knob and/or an operating point on the handle 111 in order to release the lock 125 so that the flap 110 can be opened. Furthermore, the flap 110 can have one or more actuators 103, 104 (e.g. one or more electromechanical drives), which are set up to open and to close the flap 110 automatically. Furthermore, one or more actuators (not illustrated) can be provided in order to open and to close the lock 125. These one or more actuators can be integrated in the lock 125 (e.g. in the form of an integrated electric motor).

Figure 1B:
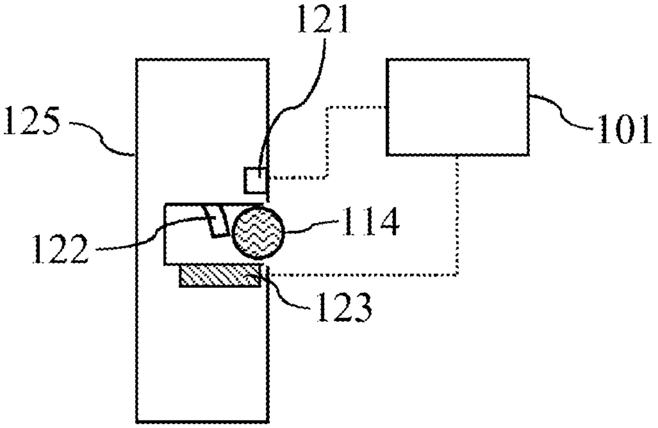
FIG. 1*b* shows an exemplary closing system for a flap and/or door of a vehicle.

FIG. 1*b* shows an exemplary lock 125 in a section along the gap between cutout 120 and flap 110. The flap 110 typically has a bolt 114, which can be clamped or latched in the lock 125 by a retainer or a catch 122 in order to close and optionally to lock the flap 110. To close the flap 110, the flap 110 can be moved toward the cutout 120 by the one or more actuators 103, so that the bolt 114 is moved completely behind the retainer 122 by the kinetic energy of the flap 110. The arrangement 100 typically has two different locking or latching stages, a first locking stage (also designated as a pre-latching position), in which the flap 110 is held in the lock 125 but there continues to be a gap between flap 110 and cutout 120, and a second locking stage (also designated as the main latching position), in which the flap 110 is held without any substantial gap in the cutout 120 (and is thus in a completely closed state). Furthermore, in the completely closed state of the flap 110 (i.e. when the bolt 114 is in the main latching position), the lock 125 can be locked with a vehicle key or automatically. The locked state can be a logical state in which energization of the lock 125 is at least partly suppressed (e.g. in reaction to one or more operating triggers). Unlocking can then lead to the lock 125 being energized and activated again in reaction to one or more operating triggers.

The arrangement 100 can have an automatic closing device 123, with which the flap 110 can be pulled automatically from the first locking stage (i.e. from the pre-latching position) into the second locking stage (i.e. into the main latching position). By using a sensor 121, it is possible to detect that the flap 110 is intended to be closed. For example, by using the sensor data from a sensor 121, it is possible to detect that the gap between the flap 110 and the cutout 120 is smaller than or equal to a specific gap threshold value. This can be detected, for example, by using one or more microswitches for the detection of the pre-latching position and/or for the detection of the main latching position. Alternatively or additionally, it is possible to detect that the flap 110 is in the first locking stage. The sensor 121 can comprise a Hall sensor with which, for example, it is possible to detect that the bolt 114 of the flap 110 is in the (immediate) vicinity of the retainer 122 and/or in the pre-latching position of the lock 125.

The closing device 123 can be set up to transport the flap 110 into the lock 125, in particular to pull it into the lock 125, as a function of the sensor data from the sensor 121. For example, the closing device 123 can comprise an electric motor and a suitable mechanism with which the bolt 114 of the door 110 can be transported behind the retainer 122 of the door lock 125 and/or into the main latching position. Thus, complete closure of the flap 110 can be effected in a convenient way.

Figure 2:
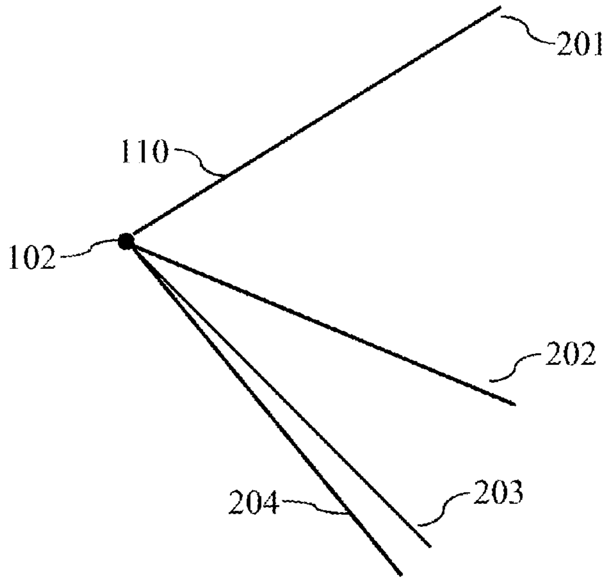
FIG. 2 shows different locations or positions of a flap and/or door during a closing operation.

The flap arrangement 100 from FIGS. 1*a*, 1*b* comprises a control unit 101. The control unit 101 (which, if necessary, can be distributed over multiple control devices) is set up to receive a control signal (e.g. from a vehicle key of the vehicle) which indicates that the flap 110 is to be closed automatically. Thereupon, the one or more actuators 103 can be caused to close the flap 110 automatically. Starting from an initial position 201, the flap 110 is moved via an intermediate position 202 into the pre-latching position 203 (see FIG. 2). In the pre-latching position 203, the flap 110 is closed but the lock 125 is in the first locking stage. The automatic closing operation effected by the one or more actuators 103 can be viewed as completed when the flap 110 is in the pre-latching position 203. The flap 110 can then be transported by a closing device 123 into the main latching position 204, so that the lock 125 is in the second locking stage.

The one or more actuators 103 for the automatic closing operation of the flap 110 can be activated by the control unit 101 in such a way that, during the movement from the initial position 201 into the pre-latching position 203, the flap 110 has a predefined, fixed closing speed. The profile of the closing speed of the flap 110 can be fixedly predefined (as a closing profile). The pre-definition of the closing speed can be the same for all the vehicles of a vehicle type and, for example, predefined during the production of a vehicle.

The closing speed should be as low as possible in order to effect safe, convenient and high-quality closing of the flap 110. On the other hand, the closing speed should be sufficiently high to ensure reliable latching in the pre-latching stage of the lock 125. This means that the closing speed should be sufficiently high to overcome the resistance of a pre-latching mechanism of the lock 125 and/or in particular the resistance of a seal 126.

Tolerances in the seal 126 of a flap 110 (e.g. tolerances in the Shore hardness of the seal, tolerances in the wall thickness and the geometry and/or the aging of the seal, etc.) and tolerances during the construction of a flap arrangement 100 (e.g. tolerances in relation to the sealing gap dimension) can have an influence on the required minimum closing speed. In particular, this can result in differences in the resistance of the pre-latching mechanism and/or in the pre-latching position. Typically, tolerances of this type cannot be taken into account adequately when establishing a fixedly predefined closing speed. Furthermore, during the operating period of a flap arrangement 100, changes in the properties of the seal and/or the flap geometry can result, which cannot be taken into account at the time at which a fixedly predefined closing speed is established.

A fixedly predefined closing speed can lead to malfunctions in the closure of a flap 110 in the event of tolerance limits of the seal and/or flap adjustment and with increasing operating time. For example, it is possible for a "reversal" of an automatic flap 110 to occur, in which a closure of the flap 110 into the pre-latching stage is prevented if the fixedly predefined closing speed is too low (e.g. following a relatively long open state duration). On the other hand, too high a fixedly predefined closing speed can lead to the closure of a flap 110 being carried out with unnecessarily high energy and with correspondingly high closing noises. An unsuitably set closing speed can thus reduce the reliability and/or the convenience of an automatic flap 110.

In this disclosure, a method and a control unit are described which make it possible to adapt the closing speed of a flap 110 in an efficient and precise way in order to increase the reliability and the convenience of an automatically closing flap 110.

The resistance effected by a seal 126 typically decreases with increasing operating time of the seal 126. The control unit 101 can be set up to determine usage information in relation to the operating time of the seal 126 of the flap arrangement 100. The usage information can, for example, comprise or indicate the duration of use of the seal 126 and/or the number of closing operations of the flap arrangement 100. The closing speed of the flap 110 can then be adapted as a function of the usage information, in particular reduced. For example, the closing speed can be reduced by means of an offset, wherein the offset rises as the operating time of the seal 126 increases.

Alternatively, the closing speed of the flap 110 in a starting phase of the usage can be loaded or increased with a (positive) offset, wherein the offset is reduced as the operating time of the seal 126 increases. Thus, it is efficiently possible to reach the situation in which an automatic flap 110 closes reliably even following "setting" of the seal 126 of the flap arrangement 100 (and is not transported directly into the main latching position 204 on account of an excessively high closing speed, and causes relatively high closing noises in the process).

In order to ensure safe closure of a flap 110 on a new vehicle, a profile of the closing speed can thus be provided with a specific offset (in particular increased), so that increased closing speeds are effected for the new vehicle. It is then possible, for example, for a percentage increase in the overall closing profile or a selective increase in an end phase of the closing profile (before the pre-latching position 203 is reached) to be carried out. The closing profile can be adapted in order to produce more harmonious flap running and/or a pleasant sound. The offset can then be reduced (smoothly or in many stages) over time from the new vehicle profile as far as a permanent profile. The offset can depend on expected setting losses of the seal 126.

Figure 4:
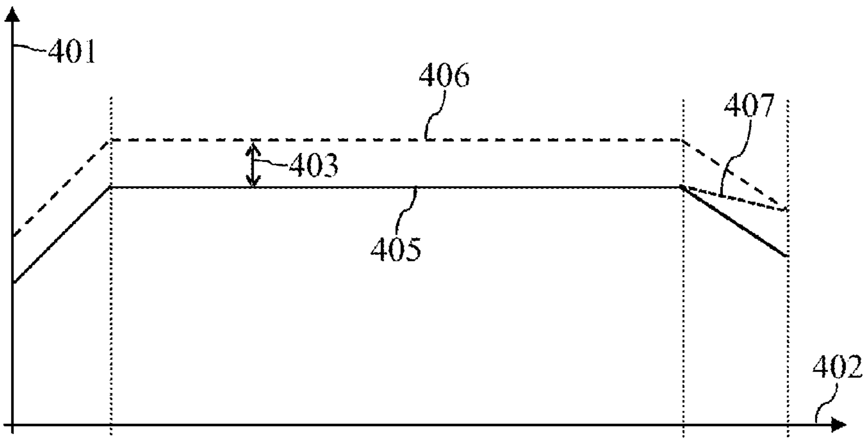
FIG. 4 shows exemplary closing profiles.

FIG. 4 shows exemplary closing profiles 405, 406, wherein the closing profile 406 is used in the event of a new seal 126 and is gradually reduced to the closing profile 405 by reducing the offset 403. The closing profiles 405, 406 indicate the course of the closing speed 401 as a function of the time 402 or as a function of the flap/door angle. The closing profiles 405, 406 have a starting phase (at the start of the closing operation) and a run-out phase (at the end of the closing operation). If necessary, the offset 407 can be applied only to the run-out phase (i.e. in the phase in which the flap 110 comes into contact with the seal 126).

During the maintenance, a check can be made

- as to whether the seal 126 has been changed, and thus the initial closing profile 406 should be used again; and/or
- as to whether the seal 126 has a permanently elevated closing resistance, and thus an increased closing profile 406 should thus be used permanently. In particular, a permanent offset 403, 407 can be established; and/or
- as to whether a specific closing profile 406 is to be used (e.g. a closing profile 406 preferred by a user of the vehicle).

The seal 126 of a flap arrangement 100 typically expands and relaxes when the flap 110 is open. This leads to an increase in the resistance of the seal 126. In the process, the resistance of the seal 126 increases as the duration of the relaxation rises. The control unit 101 can be set up to determine time information in relation to the duration of the relaxation of the seal 126 of the flap arrangement 100. In particular, it is possible to determine how long the flap 110 was in the open and/or the unclosed state. The closing speed 401 can then be adapted as a function of the time information. In particular, the closing speed 401 can be increased as the duration of the relaxation of the seal 126 rises.

Figure 5:
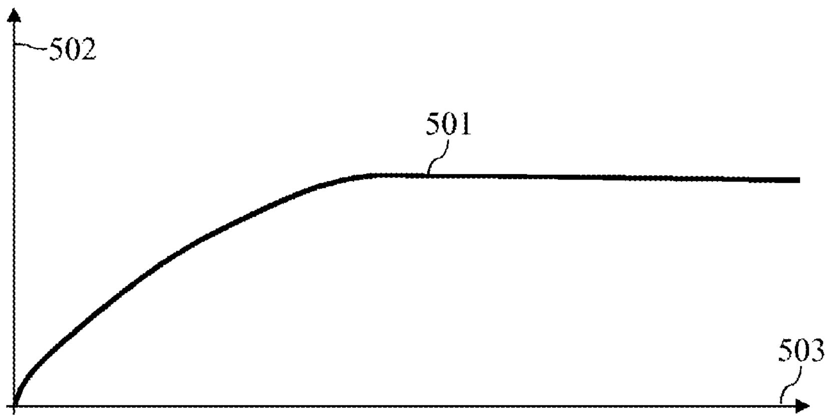
FIG. 5 shows exemplary characteristic data for the relaxation behavior of a seal.

FIG. 5 shows an exemplary relationship 501 between an offset 502 and the duration 503 of the relaxation (or the time period during which a flap 110 was in the open state). Alternatively, the reference symbol 502 can indicate the resistance and/or the sealing force of a seal 126, from which the required offset for adapting the closing speed 401 or the closing profile 405, 406 can then be determined. The relationship 501 can thus indicate a force/time relationship.

The relationship 501 can be determined experimentally in advance and stored so as to be accessible to the control unit 101. The control unit 101 can then be set up to determine an offset 502 for a closing operation on the basis of the time information and on the basis of the predefined relationship 501. The closing speed 401 or the closing profile 405, 406 for the closing operation can then be adapted with the offset 502 determined, in particular increased. Thus, a reliable and convenient closing operation can be effected.

Figure 6:
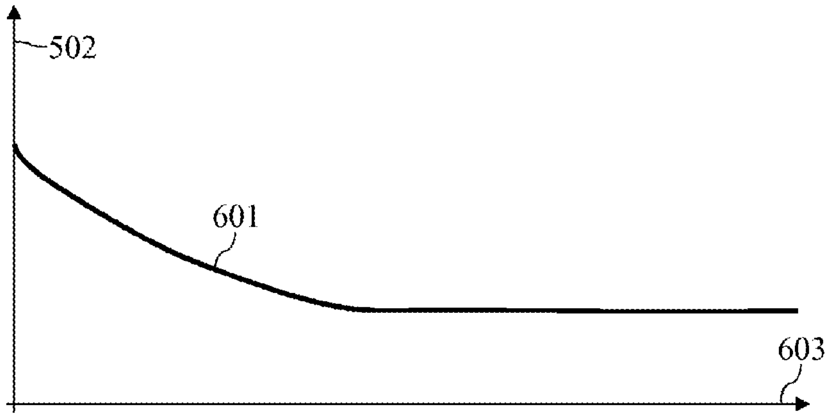
FIG. 6 shows exemplary characteristic data for the setting behavior of a seal.

FIG. 6 shows an exemplary relationship 601 between an offset 502 and the duration 603 of the use of a seal 126. Alternatively, the reference symbol 502 can indicate the resistance and/or the sealing force of a seal 126, from which the required offset for adapting the closing speed 401 or the closing profile 405, 406 can then be determined. The relationship 501 can thus be determined to indicate a force/time relationship.

The relationship 601 can be determined experimentally in advance and stored so as to be accessible to the control unit 101. The control unit 101 can then be set up to determine an offset 502 for a closing operation on the basis of the time information and on the basis of the predefined relationship 601. The closing speed 401 or the closing profile 405, 406 for the closing operation can then be adapted with the offset 502 determined, in particular reduced. Thus, a reliable and convenient closing operation can be effected permanently over the duration of use of a seal 126.

Figure 3:
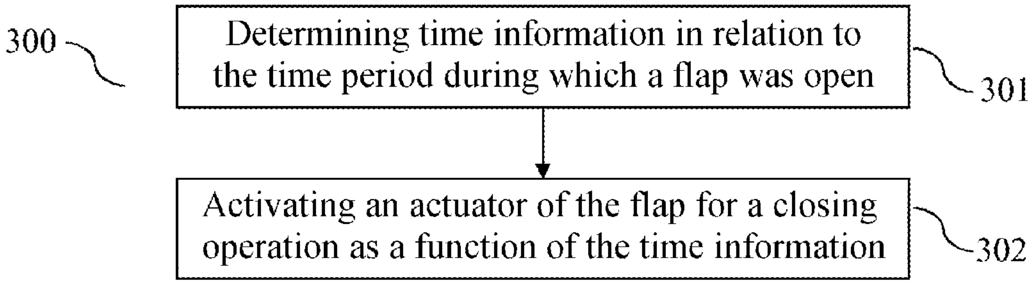
FIG. 3 shows a flowchart of an exemplary method for controlling an automatic closing operation of a flap and/or door.

FIG. 3 shows a flowchart of an exemplary method 300 for operating an automatic flap and/or door 110. The method 300 can be carried out by the control unit 101 of a flap and/or door arrangement 100. The flap and/or door 110 can be transferred automatically from an open position 201, 202 into a closed position 203, 204 by at least one actuator 103 for a closing operation, wherein the flap and/or door 110 presses against a seal 126 in the closed position 203, 204, so that a closing operation is influenced by the mechanical resistance of the seal 126.

For a closing operation of the flap and/or door 110, the method 300 comprises the determination 301 of time information in relation to an open state duration 502 during which the flap and/or door 110 was in the open position 201, 202 (uninterruptedly) before the closing operation. In other words, it is possible to determine the time duration 502 for which the flap and/or door 110 has not pressed against the seal 126 and compressed the seal 126 in the process.

Alternatively or additionally, the method 300 comprises the determination 301 of time information in relation to the duration of use 603 of the seal 126.

In addition, the method 300 comprises the operation 302 of the at least one actuator 103 for the closing operation as a function of the time information. In particular, the closing speed 401 of the closing operation can be adjusted or adapted as a function of the time information, at least during one phase of the closing operation. Thus, the reliability and the convenience of a closing operation can be increased.

The embodiments of the present invention are not restricted to the exemplary embodiments shown. In particular, it is to be noted that the description and the figures are intended merely to illustrate the principle of the methods, devices and systems proposed.

What is claimed is:

1. An apparatus comprising:

a control unit configured to control an automatic flap or door, wherein the flap or door is automatically transferrable from an open position into a closed position by at least one actuator, wherein in the closed position, the flap or door is configured to press against a seal, in relation to a closing operation of the flap or door, the control unit is configured to:

i) determine time information in relation to an entire open state time duration, wherein the flap or door was in the open position before the closing operation, and ii) operate the at least one actuator configured for the closing operation as a function of the time information.

2. The apparatus according to claim 1, wherein the seal is formed in such a way that a mechanical resistance applied to the flap or door by the seal during a closing operation because of a relaxation behavior of the seal depends on a duration, wherein during the duration, the seal could relax.

3. The apparatus according to claim 2, wherein the control unit is configured to operate the at least one actuator for the closing operation as a function of characteristic data, and the characteristic data indicate a relationship between the open state time duration and a closing speed to be used or a closing profile to be used for the closing operation.

4. The apparatus according to claim 3, wherein the control unit is set up to set a closing speed of the flap or door, at least for one phase of the closing operation, as a function of the time information.

5. The apparatus according to claim 4, wherein the closing speed of the flap or door, at least for one phase of the closing operation, is increased with an increasing open state duration.

6. The apparatus according to claim 5, wherein the control unit is configured to determine usage information in relation to a usage time of the seal; and to operate the at least one actuator for the closing operation as a function of the usage information.

7. The apparatus according to claim 6, wherein the control unit is configured to operate the actuator for a closing operation as a function of the closing profile;

to adapt the closing profile as a function of the usage information, and to adapt the closing profile with an offset depending on the duration of the usage of the seal.

8. The apparatus according to claim 7, wherein the closing operation has a starting phase, a main phase and a run-out phase; and the control unit is configured to operate the at least one actuator exclusively during the run-out phase as a function of the time information or as a function of the usage information.

9. The apparatus according to claim 8, wherein the control unit is configured to determine sensor data from a sensor, wherein the sensor is set up to detect whether the flap or door is in the open position or whether the flap or door is in the closed position; and to determine the time information on the basis of the sensor data from the sensor.

10. The apparatus according to claim 9, wherein the control unit is configured to determine temperature data in relation to a temperature of the seal during or before the closing operation; and to operate the at least one actuator for the closing operation as a function of the temperature data.

11. A method for operating an automatic flap or door, comprising:

automatically transferring the flap or door from an open position into a closed position by at least one actuator, wherein in the closed position, the flap or door presses against a seal; wherein, for a closing operation of the flap or door, the method comprises determining time information in relation to an entire open state time duration, wherein the flap or door was in the open position before the closing operation; and operating the at least one actuator for the closing operation as a function of the time information.

* * * * *